United States Patent [19]

Edmondson

[11] Patent Number: 5,520,034
[45] Date of Patent: May 28, 1996

[54] TRAILER WHEEL LOCKING AND ANTI-THEFT DEVICE

[76] Inventor: Jack M. Edmondson, 870 Indian Lake Dr., Lilburn, Ga. 30247

[21] Appl. No.: 432,948

[22] Filed: May 1, 1995

[51] Int. Cl.⁶ .................................................. B60R 25/00
[52] U.S. Cl. .............................. 70/226; 70/232; 70/237; 188/32
[58] Field of Search ......................... 70/14, 18, 19, 70/228, 238, 225, 226, 209, 237, 232, 259, 260; 188/32

[56] References Cited

U.S. PATENT DOCUMENTS

| D. 289,491 | 4/1987 | Johnson | D8/330 |
|---|---|---|---|
| D. 306,253 | 2/1990 | Solow | D8/331 |
| D. 322,925 | 1/1992 | Solow | D8/331 |
| 1,347,262 | 7/1920 | Eichorn . | |
| 1,386,414 | 8/1921 | Lawrence . | |
| 2,960,857 | 11/1960 | Winter . | |
| 3,828,590 | 8/1974 | Thiebault | 70/19 |
| 4,649,724 | 3/1987 | Raine | 70/226 |
| 4,688,408 | 8/1987 | Shroyer | 70/226 |
| 4,723,426 | 2/1988 | Beaudoin | 70/14 |
| 4,738,127 | 4/1988 | Johnson | 70/209 |
| 4,747,279 | 5/1988 | Solow | 70/238 |
| 4,819,462 | 4/1989 | Apsell | 70/14 |
| 4,856,308 | 8/1989 | Johnson | 70/209 |
| 4,878,366 | 11/1989 | Cox | 70/14 |
| 5,137,121 | 8/1992 | Leonard | 188/32 |
| 5,375,442 | 12/1994 | Hammer | 70/14 X |
| 5,410,897 | 5/1995 | Edmondson | 70/226 |

FOREIGN PATENT DOCUMENTS 1240446  7/1960  France ...................................... 188/32

*Primary Examiner*—Lloyd A. Gall
*Attorney, Agent, or Firm*—James A. Hinkle

[57] ABSTRACT

A wheel-locking device has a nut shield (13) with a wheel-bolt orifice (17) on an attachment-plate (18) end of the nut shield. The nut shield is positioned on a wheel bolt (14) between a wheel (5) and a wheel nut (15) that is tightened onto the wheel bolt. Walls (37, 39) of the nut shield have lock-rod keyholes (12, 51) that are sized and shaped to receive a keyhole shaft (11) having lock extensions (19, 40, 49, 50) positioned in line with keyhole bays (20) in the lock-rod keyholes. Then a lock rod (6) can be rotated to a locking position in which the lock extensions are not in line with the lock bays of the lock-rod keyholes. In this locking position, the lock rod is then locked onto a wheel clamp (1) that hooks over a wheel. This prevents the wheel from being rotated and prevents unlocking rotation of the lock rod in the keyholes, and prevents removal of wheel nut which thus prevents removal of the wheel from the hub, thereby providing a form of locking mechanism for a vehicle on which the wheel is positioned.

22 Claims, 6 Drawing Sheets

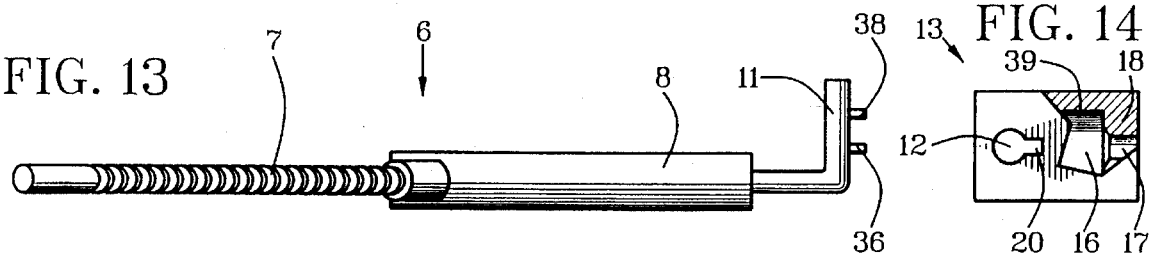
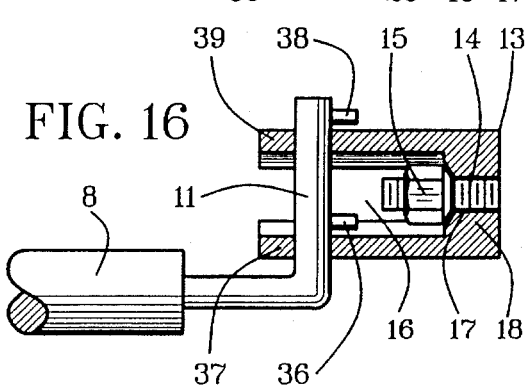
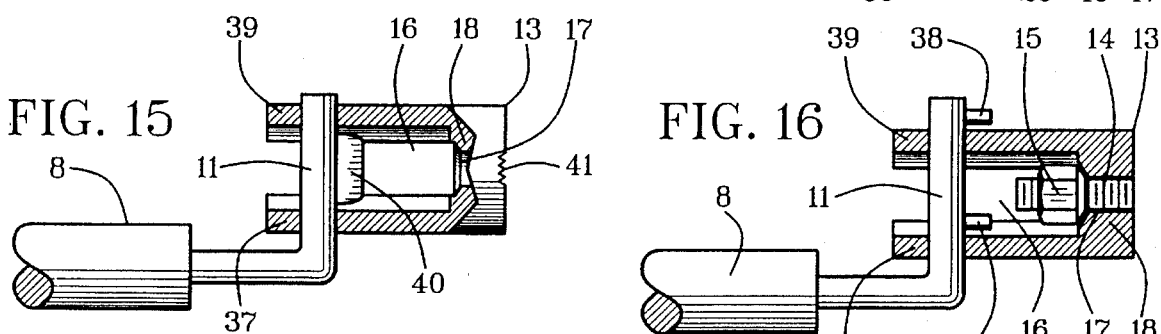
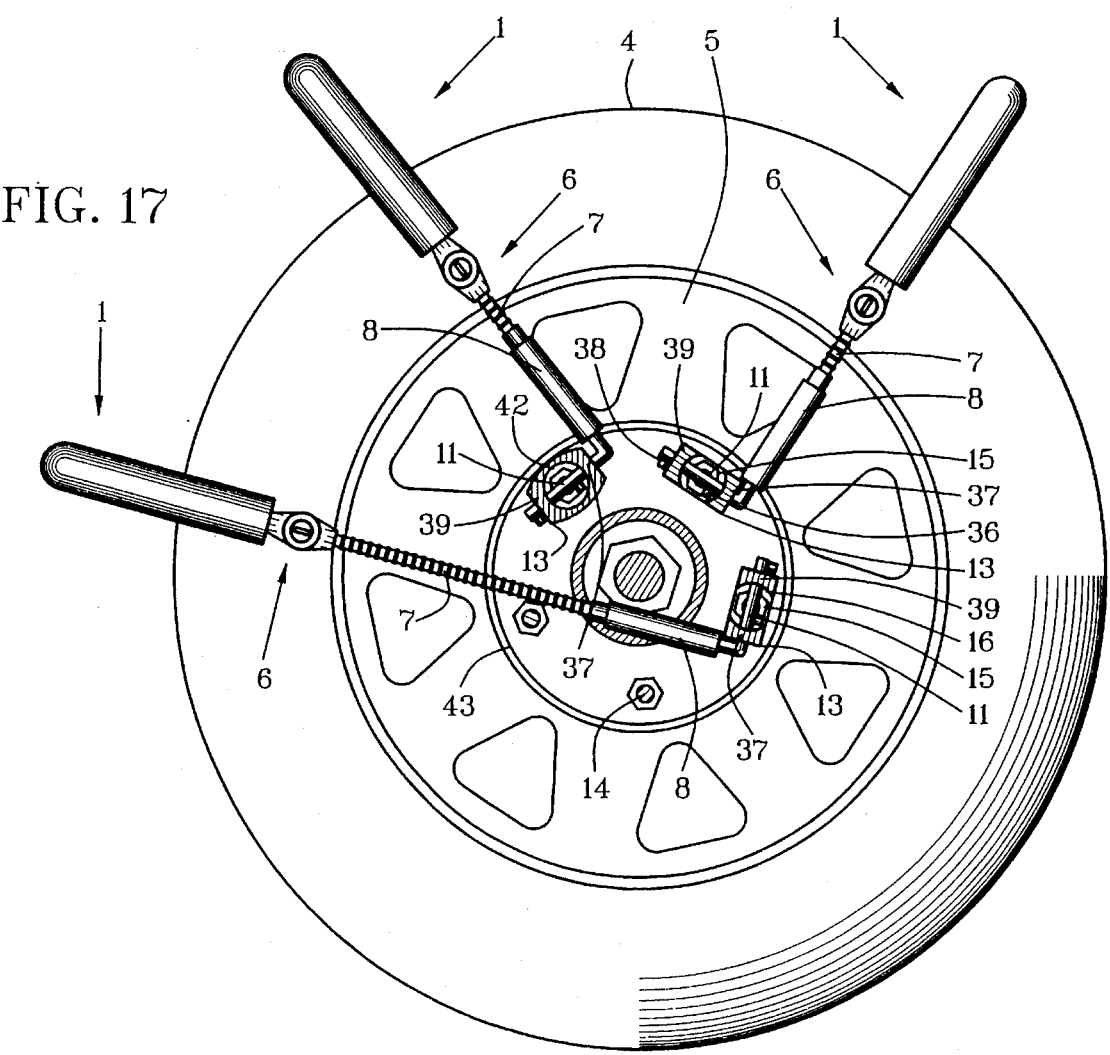

TRAILER WHEEL LOCKING AND ANTI-THEFT DEVICE

BACKGROUND OF THE INVENTION

I. Field of the Invention

The present invention relates generally to the field of wheel locks that are attachable to trailer wheels and lug nuts to prevent trailers from being stolen or moved without authorization. The invention is applicable to other types of vehicle wheels, in addition to trailers.

II. Description of the Prior Art

Locking trailers to prevent them from being stolen requires locking their wheels because there is no door to lock as for cars and trucks. There have been a variety of mechanisms for locking trailer wheels but none that attach to a lug nut on a wheel and provide a means to prevent wheel rotation as taught by this invention. U.S. Pat. No. 5,137,121 taught a chock that clamped onto a wheel rim. U.S. Pat. No. 4,878,366 taught a blocking bar that was attachable with bolts inserted through openings in wheels. U.S. Pat. No. 4,819,462 describes a chock on a bar that is attachable to lug bolts directly instead of being attachable to a nut shield that is held with a wheel nut as taught by this invention. U.S. Pat. Nos. 4,856,308 and 4,738,127, granted to the same inventor, taught a steering-wheel lock with a telescopic bar different from a telescopic bar and lock employed in this invention with lug-bolt attachment and wheel-chock features not employed in the steering-wheel lock. U.S. Pat. No. 4,723,426 taught a wheel clamp with a disk that covered the hub section of a wheel on one jaw of the clamp and a hook that grasped the opposite side of a wheel. Although these and other known devices have features that are advantageous for particular applications, they are different and do not provide the convenience, ease of attachment and economy of protection against theft that is provided by this invention.

SUMMARY OF THE INVENTION

In accordance with the present invention, it is contemplated that in light of problems that have existed and that continue to exist in this field, a primary objective of this invention is to provide a wheel-locking device which can be attached conveniently and easily.

This invention provides a wheel-locking device that is relatively lightweight and compact in size, and thus easy to handle and store. In addition, the invention will fit wheels having varying wheel bolt patterns and numbers of wheel bolts.

An object of this invention is to prevent removal of the wheel from the hub of the vehicle.

Another objective is to provide a wheel-locking device which is inexpensive to produce.

Another objective is to provide a wheel-locking device which disassembles for making it easy to carry and to store.

Yet another objective is to provide a wheel-locking device that is adaptable to a wide variety of wheel sizes, locking preferences and wheel-blocking preferences.

This invention accomplishes the above and other objectives with a wheel-blocking device having a nut shield with a wheel-bolt orifice on a base end of the nut shield. The nut shield is positioned on a wheel bolt between a wheel and a wheel nut that is tightened onto the wheel bolt. Walls of the nut shield have lock-rod keyholes that are sized and shaped to receive a lock rod having lock extensions positioned in line with lock bays in the lock-rod keyholes. Then the lock rod can be rotated to a locking position in which the lock extensions are not in line with the lock bays of the lock-rod keyholes. In this locking position, the lock rod is then locked onto a wheel guard that hooks over a wheel. This prevents the wheel from being rotated and prevents unlocking rotation of the lock rod in the keyholes, thereby providing a form of locking mechanism for a vehicle on which the wheel is positioned.

Other objects, advantages and capabilities of the invention will become apparent from the following description taken in conjunction with the accompanying drawings showing preferred embodiments of the invention.

BRIEF DESCRIPTION OF THE DRAWINGS

FIG. 13 is a plan view of the lock rod oriented to illustrate two key bosses extended from a keyhole shaft for insertion into a keyhole bay and rotated to a locking position with both of the key bosses being inside of the nut shield;

FIG. 14 is a partially cutaway side view of a nut shield;

FIG. 15 is a sectional side view of the lock rod oriented to illustrate construction with one key boss extended from a keyhole shaft for insertion into a keyhole bay and rotated to a locking position with the key boss being inside of the nut shield;

FIG. 16 is a sectional side view of the lock rod oriented to illustrate two key bosses extended from a keyhole shaft for insertion into a keyhole bay and rotated to a locking position with one of the key bosses being inside of the nut shield and the other being outside of the nut shield;

FIG. 17 is a side elevation view of three separate wheel locks illustrating different relationships of lock rods to three separate wheel nuts;

DESCRIPTION OF THE PREFERRED EMBODIMENTS

Figure 1:
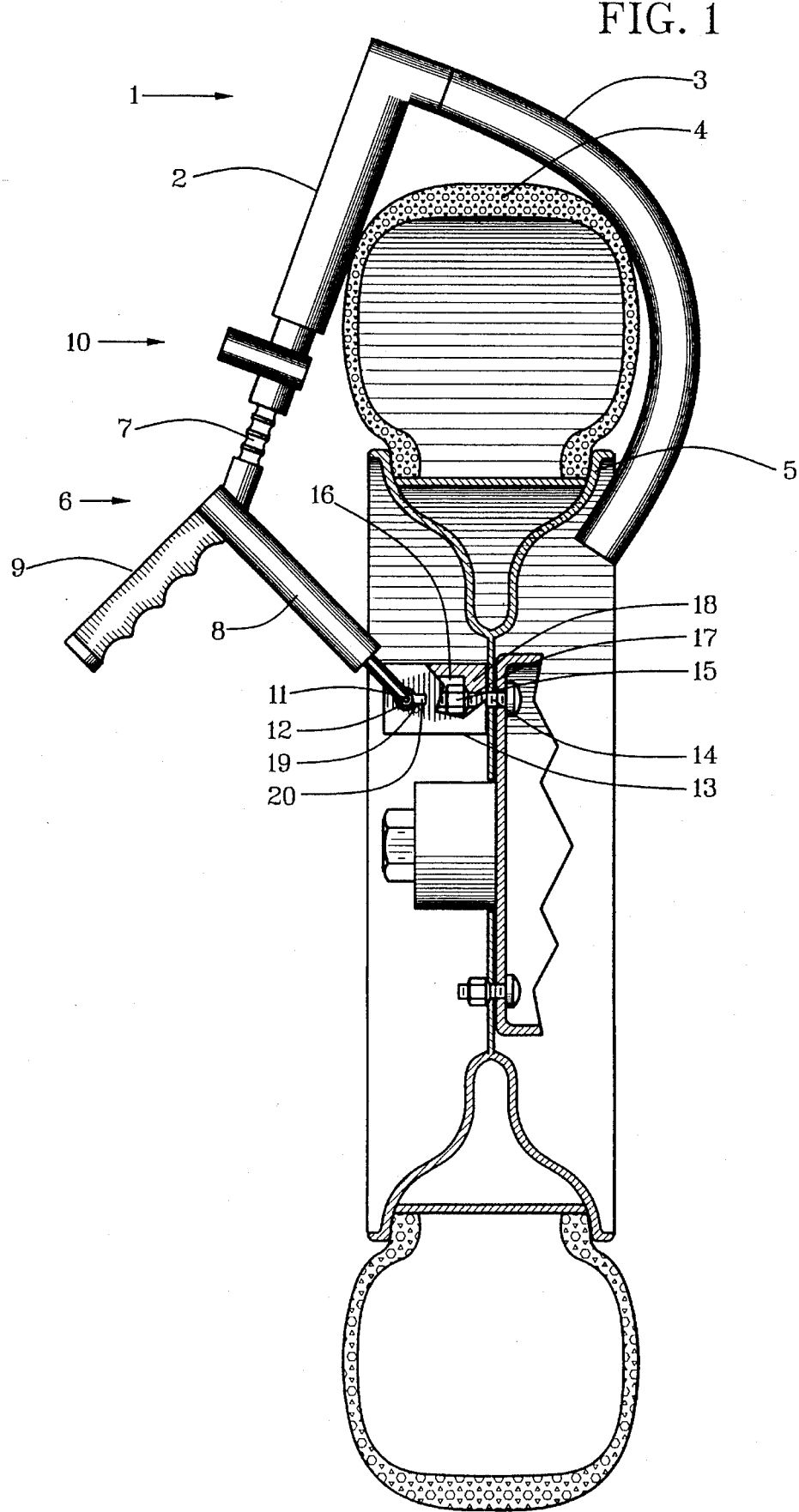
FIG. 1 is an elevation view, partially in section, of a basic embodiment of this wheel lock mounted in locking relationship to a tire mounted on a typical trailer wheel.

Referring to the drawings wherein like reference numerals designate corresponding parts throughout the several figures, reference is made first to FIG. 1. A wheel clamp 1 has a lock jaw 2 and a wheel jaw 3 in bifurcate relationship. The wheel jaw 3 is hooked over a tire 4 and wheel 5 on a vehicle such as a trailer that can not be locked internally like motor vehicles. A lock rod 6 has a lock shaft 7 that can be inserted and slidable telescopically in the lock jaw 2. A shield shaft 8 is extended at a design angle from a bifurcate juncture of the lock shaft 7 and the shield shaft 8. A handle 9 is extended from a handle end of the lock shaft 7 and the shield shaft 8 at their bifurcate junction. A locking means 10 in locking relationship between the lock shaft 7 and the lock jaw 2 is positioned proximate a handle end of the lock jaw 2.

The wheel clamp 1 shown hooked on a tire 4 and wheel 5 and having a lock rod 6 slidable telescopically in relation to the lock jaw 2, is locked onto the wheel 5 and tire 4 by first inserting a keyhole shaft 11 in lock-rod keyholes 12 in a wheel nut shield 13 of generally "U" shaped configuration. Then the wheel clamp 1 and the lock rod 6 are oriented snugly between the nut shield 13 and the wheel 5. Finally, the lock shaft 7 is locked in telescopic relationship to the lock jaw 2 with the locking means 10.

The nut shield 13 is positioned on a wheel bolt 14 and attached to the wheel 5 with a wheel nut 15. A wrench bay 16 in the nut shield 13 allows entry of a socket wrench between at least one wall of the nut shield 13 and an outside periphery of the wheel nut 15. The wheel bolt 14 is inserted into a wheel-bolt hole 17 in an attachment plate 18 proximate a nut end of the nut shield 13.

Wrench access to the wheel nut 15 in the wrench bay 16 is prevented by the keyhole shaft 11 when the keyhole shaft 11 is inserted in the lock-rod keyholes 12. Removal of the keyhole shaft 11 from the lock-rod keyholes 12 is prevented by at least one key boss 19 in non-alignment with a keyhole bay 20 when the lock rod 6 is oriented for insertion of the lock shaft 7 in the lock jaw 2. Conversely, the key boss 19 must be in alignment with the keyhole bay 20 for insertion of the keyhole shaft 11 into the keyhole bay 20. In principle, it is like putting a conventional key in a conventional keyhole when it is lined up with a keyhole bay and then not being able to remove the key when the key is rotated in the keyhole, although shapes, forms and other working relationships of parts are different. Orientation of the lock rod 6 for insertion of the lock shaft 7 in the lock jaw 2 is accomplished separately from insertion of the keyhole shaft 11 and key boss 19 into the lock-rod keyholes 12 and keyhole bay 20 respectively.

Figure 2:
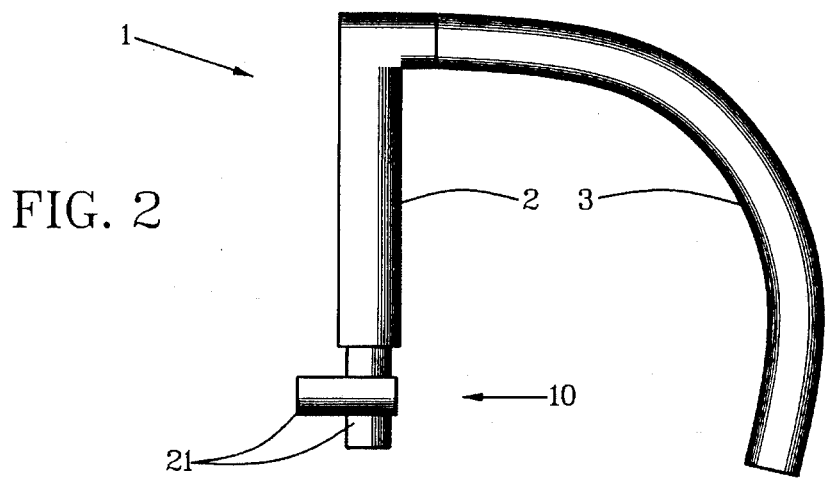
FIG. 2 is a plan view of a wheel clamp having a lock jaw and a wheel jaw.
Figure 3:
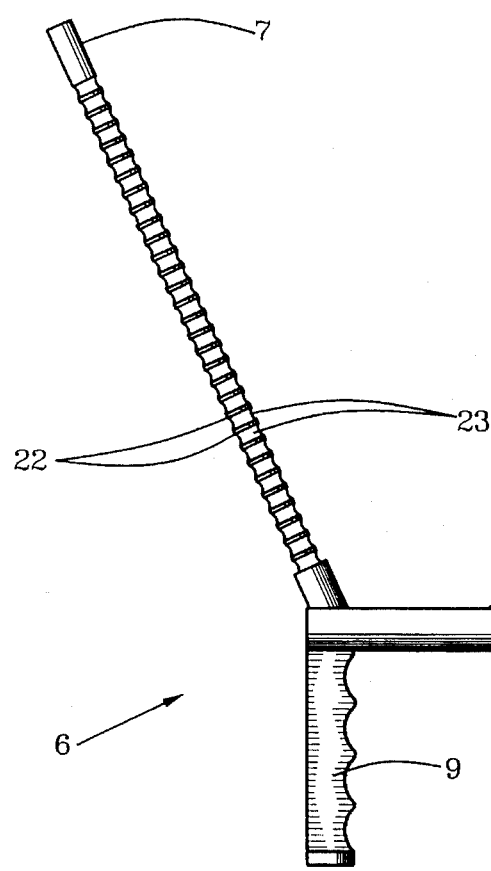
FIG. 3 is a plan view of a lock rod having a lock shaft, a shield shaft, a handle, a keyhole shaft, and a key boss.
Figure 4:
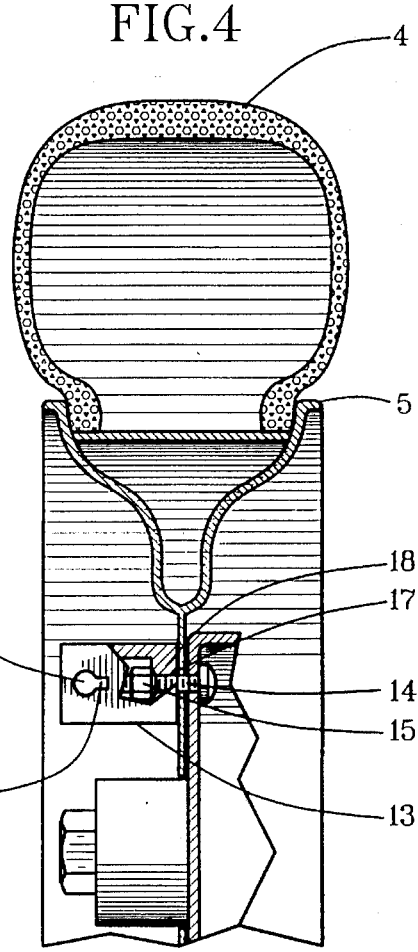
FIG. 4 is a partial section side view of a nut shield attached to a wheel bolt of a typical trailer wheel shown in partial section view with a tire mounted.

Reference is made now to FIGS. 2–4. The lock jaw 2 and the wheel jaw 3 can be cylindrical or tubular members as shown in FIG. 2. Likewise, the locking means 10 can be a cylindrical shaft lock 21 that receives a circularly grooved lock shaft 7 and locks between circular ridges 22 of circular grooves 23 illustrated in FIG. 3. In FIG. 3, the key boss 19 on the keyhole shaft 11 is shown in line with the keyhole bay 20 in the nut shield 13 that is attached to the wheel 5 in FIG. 4. The keyhole shaft 11 is L-shaped perpendicularly in relation to the shield shaft 8 as shown in FIGS. 13–17 for insertion into the lock-rod keyholes 12. A select portion of the shield shaft 8 can be smaller in diameter proximate the keyhole shaft 11 for desired use conditions.

Figure 5:
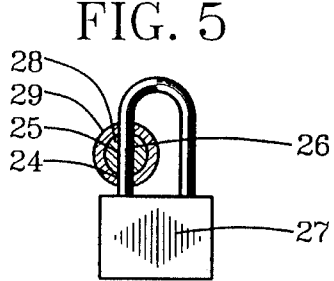
FIG. 5 is a cross-sectional view of a cylindrical lock shaft inside of a cylindrical lock jaw in locking relationship to a shackle of a padlock at a position of concentricity of a lock-shaft orifice and a lock-jaw orifice.
Figure 6:
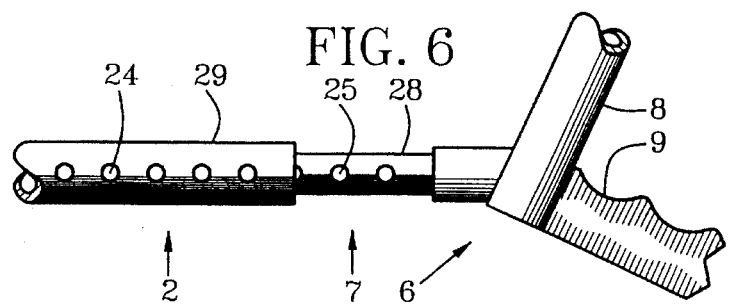
FIG. 6 is a sectional plan view of a cylindrical lock shaft inside of a cylindrical lock jaw with lock-shaft orifices and lock-jaw orifices that are positioned concentrically for locking relationship to a padlock shackle or other lock member.
Figure 7:
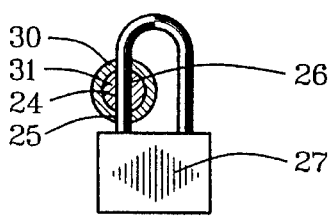
FIG. 7 is a cross-sectional view of a cylindrical lock shaft on an outside of a cylindrical lock jaw in locking relationship to a shackle of a padlock at a position of concentricity of a lock-shaft orifice and a lock-jaw orifice.
Figure 8:
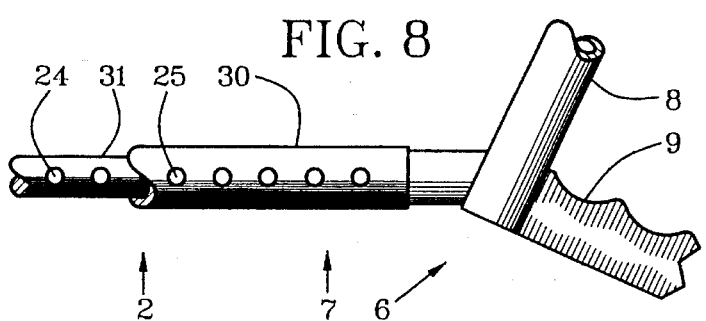
FIG. 8 is a sectional plan view of a cylindrical lock shaft on an outside of a cylindrical lock jaw with lock-shaft orifices and lock-jaw orifices that are positioned concentrically for locking relationship to a padlock shackle or other lock member.
Figure 9:
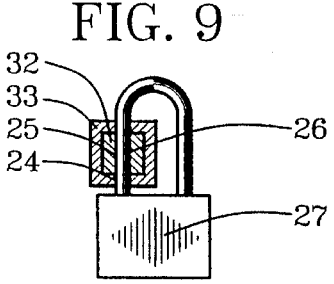
FIG. 9 is a cross-sectional view of a rectangular lock shaft inside of a rectangular jaw in locking relationship to a shackle of a padlock at a position of concentricity of a lock-shaft orifice and a lock-jaw orifice.
Figure 10:
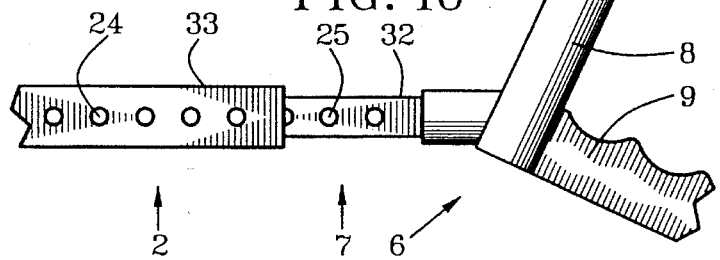
FIG. 10 is a sectional side view of a rectangular lock shaft inside of a rectangular jaw with lock-shaft orifices and lock-jaw orifices that are positioned concentrically for locking relationship to a padlock shackle or other lock member.
Figure 11:
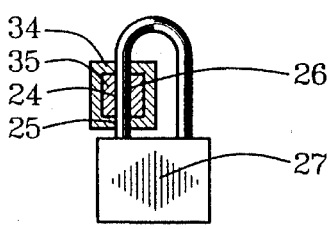
FIG. 11 is a cross-sectional view of a rectangular lock shaft on an outside of a rectangular jaw in locking relationship to a shackle of a padlock at a position of concentricity of a lock-shaft orifice and a lock-jaw orifice.
Figure 12:
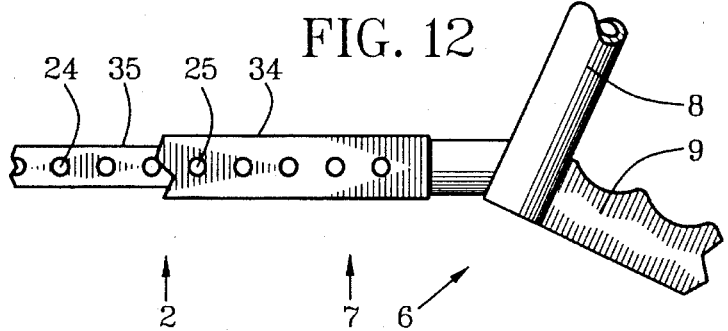
FIG. 12 is a sectional side view of a rectangular lock shaft on an outside of a rectangular jaw with lock-shaft orifices and lock-jaw orifices that are positioned concentrically for locking relationship to a padlock shackle or other lock member.

Reference is made now to FIGS. 5–12 that illustrate padlocking means for locking different forms of a lock shaft 7 to different forms of a lock jaw 2. Lock-jaw lock holes 24 and lock-shaft lock holes 25 for receiving a shackle 26 of a lock means such as a padlock 27 are illustrated in each of FIGS. 5–12. Differences are in which is inside and which is outside in both cylindrical and rectangular forms of the lock jaw 2 and the lock shaft 7. In FIGS. 5–6, a cylindrical inside lock shaft 28 and a cylindrical outside lock jaw 29 are in telescopic relationship for locking by a shackle 26. In FIGS. 7–8, a cylindrical outside lock jaw 30 and a cylindrical inside lock shaft 31 are in telescopic relationship for locking by a shackle 26. In FIGS. 9–10, a rectangular inside lock shaft 32 and a rectangular outside lockjaw 33 are in telescopic relationship for locking by a shackle 26. In FIGS. 11–12, a rectangular outside lockjaw 34 and a rectangular inside lock shaft 35 are in telescopic relationship for locking by a shackle 26.

Reference is made now to FIGS. 13–16 which illustrate relationships of different positions and forms of a key boss 19 to a keyhole bay 20 and to inside peripheries of walls of the nut shield 13 which provide a wrench bay 16 as described in relation to FIG. 1. A first key boss 36, shown in FIG. 13, is extended perpendicularly from the keyhole shaft 11 at a position for contact with an inside surface of a first side 37, shown in FIGS. 15–16, of the nut shield 13 shown in FIGS. 14–16. A second key boss 38, shown in FIG. 13, is extended perpendicularly from the keyhole shaft 11 at a position for contact with an outside surface of a second side 39, shown in FIGS. 15–16, of the nut shield 13, shown in FIGS. 14–16. As depicted in FIG. 15, a single key boss 40 sized and shaped for contact with the first side 37 and the second side 39 of the inside periphery of the nut shield 13 can be extended perpendicularly from the keyhole shaft 11. As depicted in FIG. 16, the second key boss 38 can be extended from the keyhole shaft 11 at a position for contact with an outside periphery of the nut shield 13 and a portion of the shield shaft 8 can be sized and shaped for contact with an opposite side of an outside periphery of the nut shield 13 for a locking mode.

Also shown in FIG. 15 are restraining grooves 41 on a wheel end of the nut shield 13. These restraining grooves 41 are functional primarily for preventing rotation of the nut shield 13 on wheels 5 which do not have closely adjacent rim walls to prevent rotation as described in relation to FIG. 17.

Reference is made now to FIG. 17. Three separate wheel clamps 1 with lock rods 6 having keyhole shafts 11 in locking relationship to nut shields 13 are shown in three separate positions on a wheel 5 and a tire 4. A nut shield 13 on a right side of FIG. 17 has a first side 37 and a second side 39 with a shield shaft 8 extended from a keyhole shaft 11 in a direction that the wheel clamp 1 can be positioned on a side of the wheel 5 and tire 4 that are adjacent to or on a same side of the wheel 5 as a wheel nut 15 with which the nut shield 13 is attached to the wheel 5. On a left side of FIG. 17, a nut shield 13 has a first side 37 and a second side 39 with a shield shaft 8 extended from a keyhole shaft 11 in a direction that the wheel clamp 1 can be positioned on a side of the wheel 5 and tire 4 that are opposite from or on an opposite side of the wheel 5 from a wheel nut 15 with which the nut shield 13 is attached to the wheel 5. A third wheel clamp 1 between the other two wheel clamps 1 is positioned on a lock rod 6 with a keyhole shaft 11 positioned in a nut shield 13 having a cylindrical wrench bay 42 with a circular wall instead of a U-shaped wall as depicted for the other forms of the nut shield 13.

Positioning of the wheel clamp 1 and lock rod 6 extended from a wheel bolt 14 to a same side of a wheel 5 is best suited for relatively large wheels 5. Without necessarily requiring a different size of wheel lock, relatively smaller wheels 5 can be locked by positioning the wheel clamp 1 and lock rod 6 on an opposite side of the wheel 5 from the wheel bolt 14 to which the corresponding nut shield 13 is fastened with a wheel nut 15.

The cylindrical wrench bay 42 prevents side access to wheel nuts 15 with chisel-like tools that might be used to remove wheel nuts 15 on some types of wheels 5. Most types of wheels 5, however, do not provide access to open sides of U-shaped nut shields 13.

Rotation of nut shields 13 is arrested by outwardly extending wheel sections 43 of most wheels 5 immediately adjacent to wheel bolts 14. Usually such outwardly extending wheel sections 43 are arcuately shaped and sufficiently close to the wheel bolts 14 to provide structural integrity of the wheels 5. On some wheels, the outwardly extending wheel sections 43 are so close to wheel bolts 14 that there is insufficient space for walls of a nut shield 13 to allow walls for the cylindrical wrench bay 42. Nearness of the outwardly extending wheel sections 43 to the wheel bolts 14 prevents rotation of the nut shield 13 in most use conditions.

Although a same form and plurality of key bosses 36 and 38 are shown extending from the keyhole shaft 11, either single key boss 40 or other positioning of key bosses 36 and 38 as described in relation to FIGS. 13–16 can be employed with either positioning of wheel clamp 1 or with either type of wrench bay 16 or 42.

Figure 18:
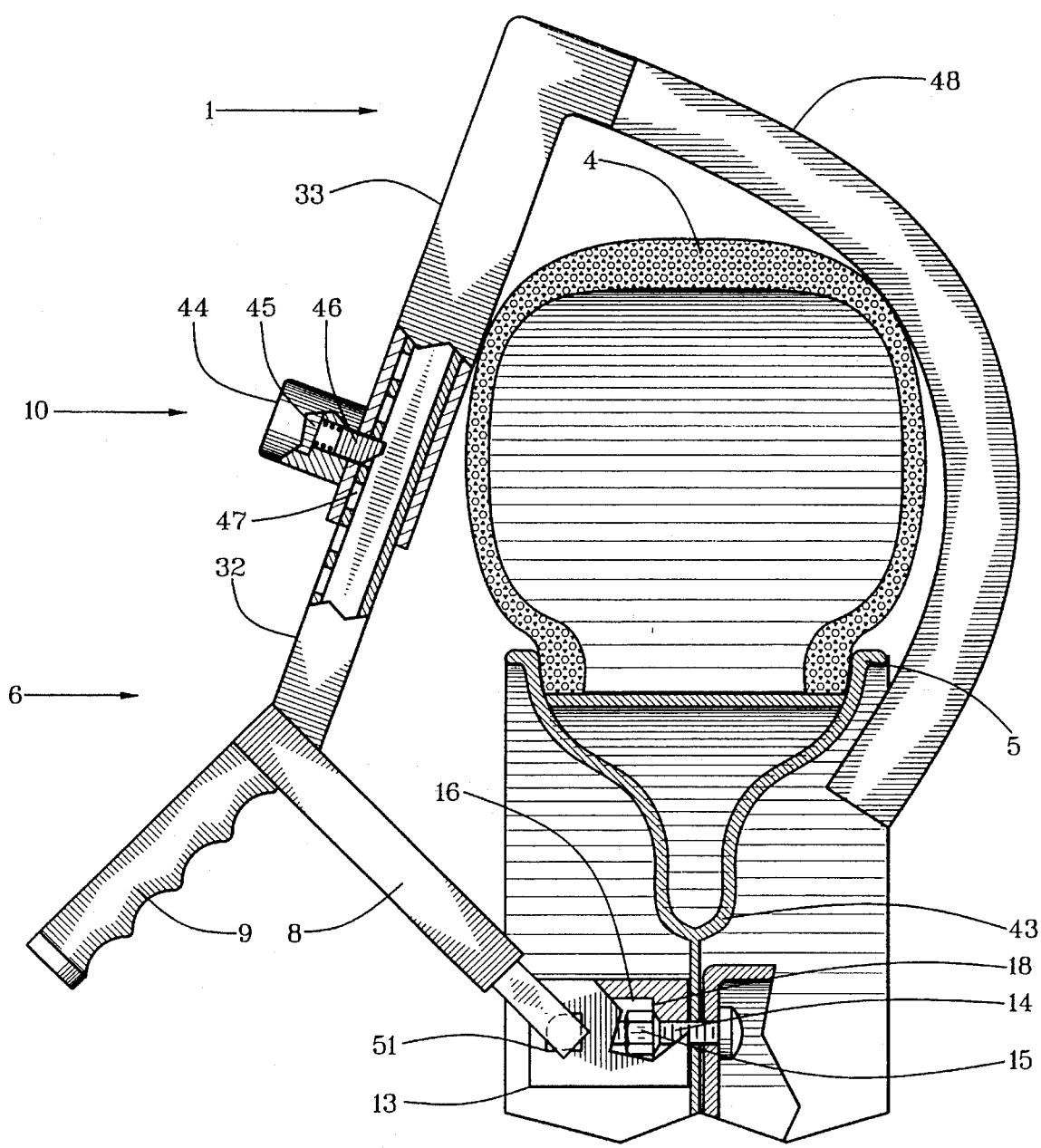
FIG. 18 is a partial sectional elevation view of a square-jawed lock rod with a lock latch in locking relationship to a cross section of a wheel with a tire mounted on it.

Reference is made now to FIG. 18. A rectangular outside lock jaw 33 can have a lock housing 44 in which is positioned a lock cylinder 45 having a lock latch 46 in lock-engaging relationship between the lock cylinder 45 and rod orifices 47 in the rectangular inside lock shaft 32. A telescopic relationship between the rectangular outside lock jaw 33 and the rectangular inside lock shaft 32 is described in relation to FIGS. 9–10 but with a different locking means. A rectangular wheel jaw 48 also can be employed with this or with other forms of the lock rod 6.

Figure 19:
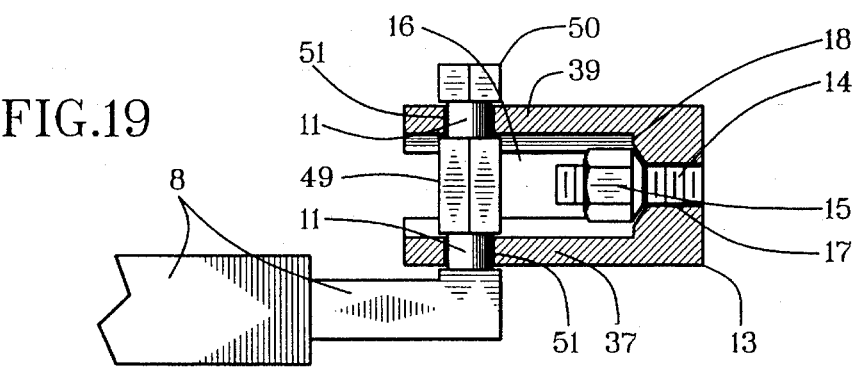
FIG. 19 is partial sectional view of a rectangular key boss in working relationship to a nut shield.

Referring now to FIGS. 18 and 19. A first rectangular key boss 49 has a plurality of sides positioned at desired distances radially from a keyhole shaft 11. The first rectangular key boss 49 can be sized and shaped to fit between opposite sides 37 and 39 of a nut shield 13 having a wrench bay 16 with open sides or cylindrical wrench bay 42 as described in relation to FIG. 17. Additionally, a second rectangular key boss 50 can be extended from the keyhole shaft 11 at a position outside of the nut shield 13. Rectangular key holes 51 on opposite sides of the nut shield 13 are sized and shaped to receive rectangular key bosses 49 and 50 in sliding relationship. Rotation of the keyhole shaft 11 positions corners of the rectangular key bosses 49 and 50 in non-aligned relationship to the rectangular keyholes 51 to prevent removal of the rectangular key bosses 49 and 50. The rectangular key bosses 49 and 50 can have a reasonable plurality of three or more sides. Radii of circumferential axes of rectangular key bosses 49 and 50 fit designedly within radii of circumferential axes of rectangular keyholes 51.

Figure 20:
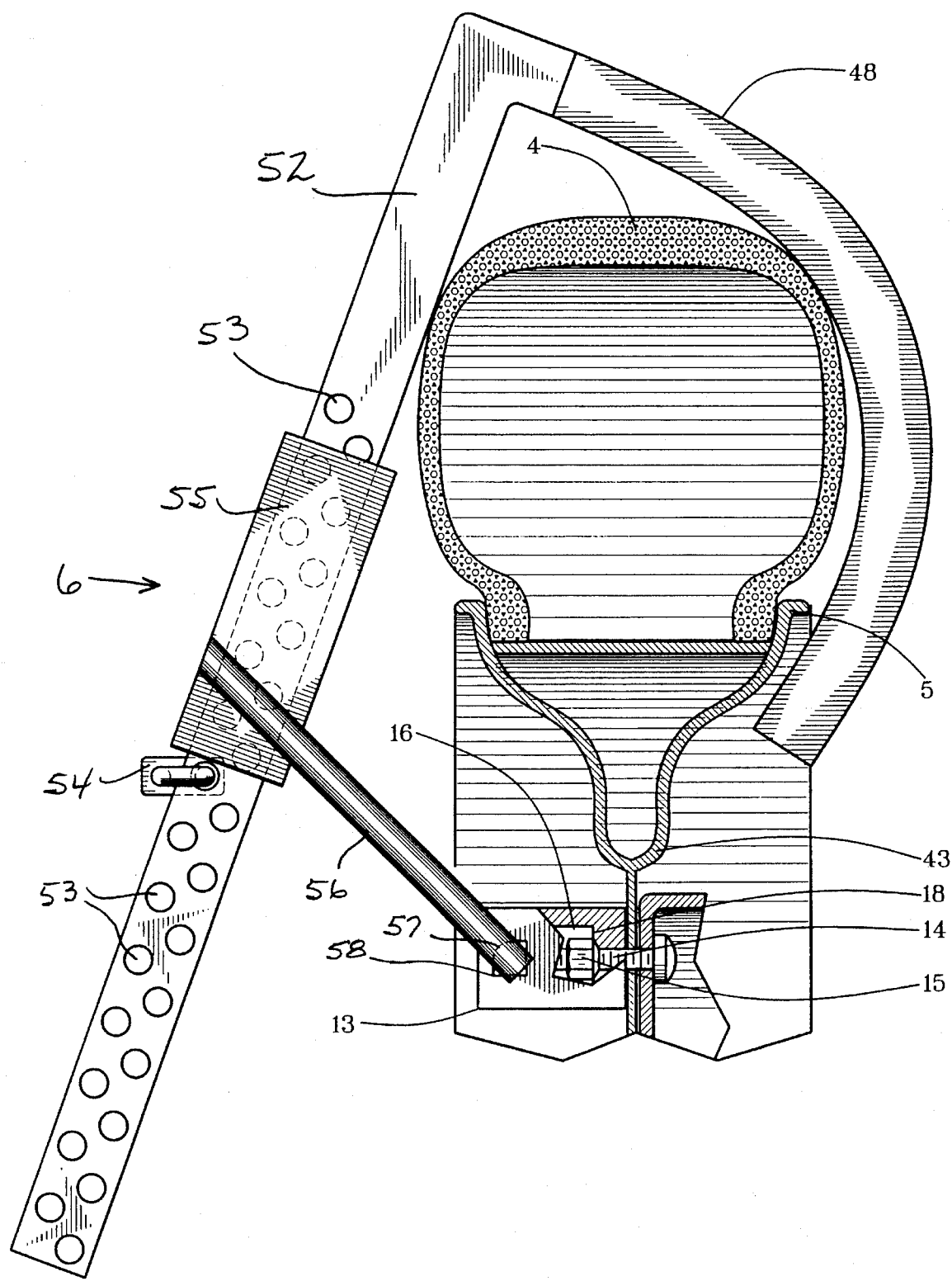
FIG. 20 is an elevation view, partially in section, of another embodiment of the invention shown in locking relationship to a tire mounted on a typical trailer wheel.

Another embodiment of the present invention is shown in FIG. 20 wherein a rectangular inside lock shaft 52 is attached to the rectangular wheel jaw 48, much in the manner shown by the embodiments of FIGS. 1, 2 and 18. The embodiment of this particular figure works essentially the same as the aforementioned embodiments, with certain details changed to add to the security and simplicity of the invention.

It is anticipated that the embodiment of FIG. 20 will have both the wheel jaw 48 and the inside lock shaft 52 of rectangular, tubular steel for ease of manufacture and less expense. The shaft of the lock shaft 52 will project a desired distance and will have a plurality of lock shaft lock holes 53 therein, through which a padlock 54 may be placed to lock the system in place. To effect adjustment to a particular size wheel and to maintain the lock rod 6 in place on the wheel, there is provided a rectangular outside lock shaft 55 which is configured to be slidable over the inside lock shaft 52 and fully adjustable along the length thereof. Attached to the lock shaft 55 is a shield shaft 56 which projects toward the wheel and engages the nut shield 13 by the placement of a keyhole shaft 57 (shown in broken lines) through the keyhole 58 in a manner similar to the embodiments of FIGS. 1 and 18. While in FIG. 20 the keyhole 58 is shown as a square aperture, it could also be a classic "keyhole" shape.

In order to utilize the embodiment of FIG. 20, it is merely necessary to place the nut shield upon the wheel in the manner described for the other embodiments herein, place the keyhole shaft 57 through the keyhole 58 in a manner similar to that shown in FIGS. 15 and 16. The outside lock shaft 55 will then accept the inside lock shaft 52 therein as the wheel jaw 48 is placed around the tire and wheel to be protected. At this point the user will position the wheel jaw 48 tightly against the tire and slide the outside lock jaw 55 along the inside lock shaft 52 as far as it will go to provide a firm and rigid unit between all of the operative parts. The user will then place the padlock 54 into a shaft hole nearest the distal end of the outside lock jaw 55 to secure the locking device and to prevent the reciprocation of the outside lock jaw 55 along the inside lock shaft 52.

In the embodiment of FIG. 20, should the wheel and tire assembly be rolled with the lock rod 6 installed, ground pressure on the lock shaft 52 and wheel jaw 48 will only cause the outside lock jaw 55 to slide on the inside lock shaft 52 away from the lock and will not transfer any weight to the nut shield 13, wheel bolt 14 or wheel nut 15, as could be the case in the other embodiments herein.

Various modifications may be made of the invention without departing from the scope thereof and it is desired, therefore, that only such limitations shall be placed thereon as are imposed by the prior art and which are set forth in the appended claims.

What is claimed is:

1. A wheel lock comprising:

a nut shield having a pair of parallel shield walls defining a wrench bay sized and shaped to receive an outside periphery of a socket wrench, a nut end of the nut shield having an attachment plate perpendicular to the shield walls, a wheel-bolt hole positioned centrally in the nut end of the nut shield, a lock-rod keyhole disposed in each of the shield walls opposite to one another, at least one of the lock-rod keyholes having at least one keyhole bay extended from said one of the lock-rod keyholes, a lock rod having a lock shaft with a handle end of the lock shaft attached to a handle end of a shield shaft at a predetermined angle between the lock shaft and the shield shaft, a keyhole shaft extended perpendicularly from a shield end of the shield shaft, at least one key boss extended from a side of the keyhole shaft, a wheel clamp having the lock shaft and a wheel jaw in bifurcate relationship, a lock jaw surrounding the lock shaft, the lock shaft being in telescopically slidable relationship to the lock jaw, the wheel jaw being sized and shaped to receive a portion of a wheel attached to a vehicle by at least one wheel bolt extended through the wheel-bolt hole and a wheel nut threaded onto the wheel bolt with the attachment plate positioned between the wheel nut and the wheel, and a locking means in telescopically lockable relationship between the lock jaw and the lock shaft.

2. A wheel lock as claimed in claim 1 wherein:

the nut shield is U-shaped, the nut end of the nut shield is a base end of a U-shape of the nut shield, legs of the U-shape of the nut shield are opposite walls of the nut shield, inside peripheries of the legs of the U-shaped nut shield are arcuate oppositely to receive the outside periphery of the socket wrench, and the lock-rod keyholes are disposed opposite to one another in legs of the U-shaped nut shield.

3. A wheel lock as claimed in claim 1 wherein:

the inside periphery of the nut shield is cylindrical, a rim side of an outside periphery of the nut shield is contoured arcuately.

4. A wheel lock as claimed in claim 1 wherein an outside periphery of the lock shaft and an inside periphery of the lock jaw are cylindrical, and the outside periphery of the lock shaft is sized and shaped to be in slidable relationship to the inside periphery of the lock jaw.

5. A wheel lock as claimed in claim 4 wherein the locking means in lockable relationship between the lock jaw and the lock shaft is a shaft lock in lock-engaging relationship to circumferential ridges between circumferential grooves on the lock shaft.

6. A wheel lock as claimed in claim 4 wherein the locking means in lockable relationship between the lock jaw and the lock shaft is a padlock having a lock shackle in lock-engaging relationship between jaw orifices in the lock jaw and rod orifices in the lock shaft which are positioned concentrically for insertion of the lock shackle.

7. A wheel lock as claimed in claim 1 wherein an inside periphery of the lock jaw and an outside periphery of the lock shaft are cylindrical, and the inside periphery of the lock jaw is sized and shaped to be in slidable relationship to the outside periphery of the lock shaft.

8. A wheel lock as claimed in claim 7 wherein the locking means in telescopically lockable relationship between the lock jaw and the lock shaft is a padlock having a lock shackle in lock-engaging relationship between jaw orifices in the lock jaw and rod orifices in the lock shaft which are positioned concentrically for insertion of the lock shackle.

9. A wheel lock as claimed in claim 1 wherein an outside periphery of the lock shaft and an inside periphery of the lock jaw are rectangular, and the outside periphery of the lock shaft is sized and shaped to be in slidable relationship to the inside periphery of the lock jaw.

10. A wheel lock as claimed in claim 9 wherein the locking means in telescopically lockable relationship between the lock jaw and the lock shaft is a padlock having a lock shackle in lock-engaging relationship between jaw orifices in the lock jaw and rod orifices in the lock shaft which are positioned concentrically for insertion of the lock shackle.

11. A wheel lock as claimed in claim 9 and further comprising a lock cylinder in a lock housing positioned on the lock jaw, and a lock latch in lock-engaging relationship between the lock cylinder and rod orifices in the lock shaft.

12. A wheel lock as claimed in claim 1 wherein an inside periphery of the lock jaw and an outside periphery of the lock shaft are rectangular, and the inside periphery of the lock jaw is sized and shaped to be in slidable relationship to the outside periphery of the lock shaft.

13. A wheel lock as claimed in claim 12 wherein the locking means in telescopically lockable relationship between the lock jaw and the lock shaft is a padlock having a lock shackle in lock-engaging relationship between jaw orifices in the lock jaw and rod orifices in the lock shaft which are positioned concentrically for insertion of the lock shackle.

14. A wheel lock as claimed in claim 1 wherein the wheel jaw is sized and shaped to extend about a tire on the wheel and to engage a surface of an opposite side of the wheel from the nut shield.

15. A wheel lock as claimed in claim 14 wherein the wheel jaw is sized and shaped to extend a predetermined distance from an outside periphery of the wheel to obstruct rotation of the wheel by contact of the wheel jaw with a surface on which the vehicle is positioned.

16. A wheel lock as claimed in claim 1 and further comprising a lock handle extended from a bifurcation of the lock shaft and the shield shaft of the lock rod.

17. A wheel lock as claimed in claim 1 wherein the at least one key boss is a first key boss, a second key boss, the first key boss is extended from the keyhole shaft at a position inside of a first side of the nut shield and the second key boss is extended from the keyhole shaft at a position outside of a second side of the nut shield with the keyhole shaft inserted in the lock-rod keyholes.

18. A wheel lock as claimed in claim 1 wherein the at least one key boss is a first key boss, a second key boss, the first key boss is extended from the keyhole shaft at a position inside of a first side of the nut shield and the second key boss is extended from the keyhole shaft at a position inside of a second side of the nut shield with the keyhole shaft inserted in the lock-rod keyholes.

19. A wheel lock as claimed in claim 1 wherein the at least one key boss is a single key boss extended from the keyhole shaft intermediate a position inside of a first side of the nut shield and a position inside of a second side of the nut shield with the keyhole shaft inserted in the lock-rod keyholes.

20. A wheel lock as claimed in claim 1 wherein:

the at least one key boss is a first rectangular key boss, a second rectangular key boss, sides of the first rectangular key boss are positioned away from the keyhole shaft and extended parallel to the keyhole shaft intermediate a position inside of a first side of the nut shield and a position inside of a second side of the nut shield with the keyhole shaft inserted in the lock-rod keyholes, sides of the second rectangular key boss are positioned away from the keyhole shaft and extended parallel to the keyhole shaft from a position outside of the second side of the nut shield a design distance in a direction towards an end of the keyhole shaft, the two lock-rod keyholes are a first rectangular orifice and a second rectangular orifice, the second rectangular orifice is sized and shaped to receive the second rectangular key boss in the second side of the nut shield, the first rectangular orifice is sized and shaped to receive the first rectangular key boss in the first side of the nut shield, and the keyhole shaft is cylindrical intermediate the first rectangular key boss and the second rectangular key boss and intermediate the first rectangular key boss and the shield end of the shield shaft.

21. A wheel lock as claimed in claim 1 wherein:

the at least one key boss is a single rectangular key boss, sides of the single rectangular key boss are positioned away from the keyhole shaft and extended parallel to the keyhole shaft intermediate a position inside of a first side of the nut shield and a position inside of a second side of the nut shield with the keyhole shaft inserted in the lock-rod keyholes, and the two lock-rod keyholes are at least a first rectangular orifice sized and shaped to receive the single rectangular key boss and a second orifice sized and shaped to receive at least the keyhole shaft.

22. A wheel lock comprising:

a nut shield having a pair of parallel shield walls defining a wrench bay sized and shaped to receive an outside periphery of a socket wrench, a nut end of the nut shield having an attachment plate perpendicular to the shield walls, a wheel-bolt hole positioned centrally in the nut end of the nut shield, a lock-rod keyhole disposed in each of the shield walls opposite to one another, at least one of the lock-rod keyholes having at least one keyhole bay extended from said one of the lock-rod keyholes, a lock jaw having a distal end and a proximal end, a shield shaft having a distal end and a proximal end, the proximal end of the shield shaft attached to the proximal end of the lock jaw at a predetermined angle between the lock jaw and the shield shaft, a keyhole shaft extended perpendicularly from a shield end of the shield shaft, at least one key boss extended from a side of the keyhole shaft, a lock shaft, a wheel clamp having the lock shaft and a wheel jaw in bifurcate relationship, the lock shaft being in telescopically slidable relationship to the lock jaw, the wheel jaw being sized and shaped to receive a portion of a wheel attached to a vehicle by at least one wheel bolt extended through the wheel-bolt hole and a wheel nut threaded onto the wheel bolt with the attachment plate positioned between the wheel nut and the wheel, and a locking means in telescopically lockable relationship between the lock jaw and the lock shaft.

* * * * *